Sept. 17, 1929.  J. Q. BELL  1,728,718
CLAMPING APPARATUS
Filed Oct. 13, 1928  2 Sheets-Sheet 1
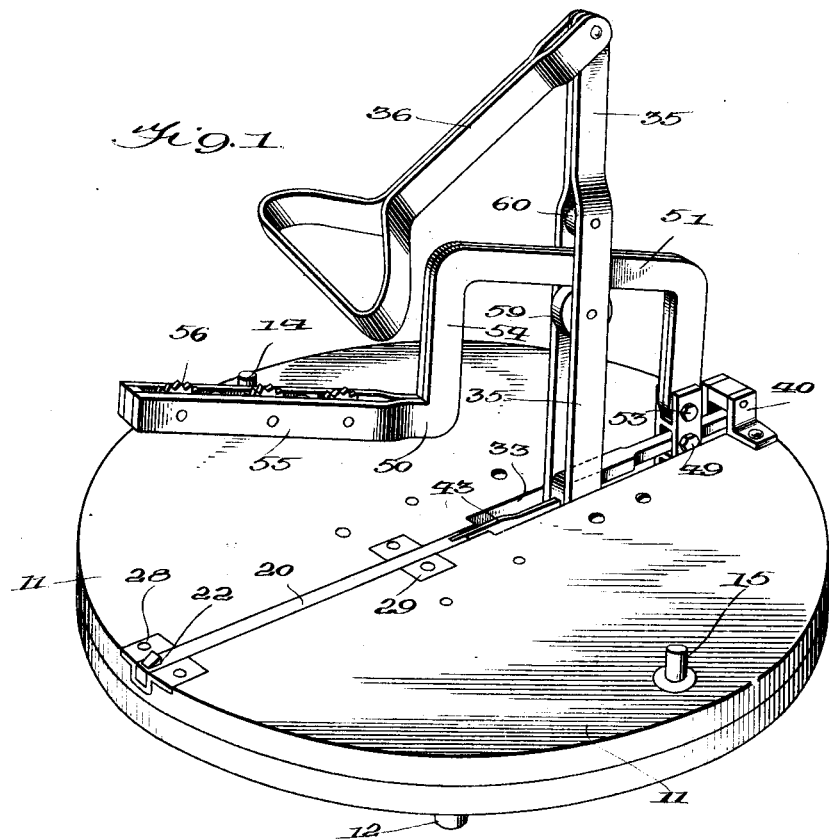
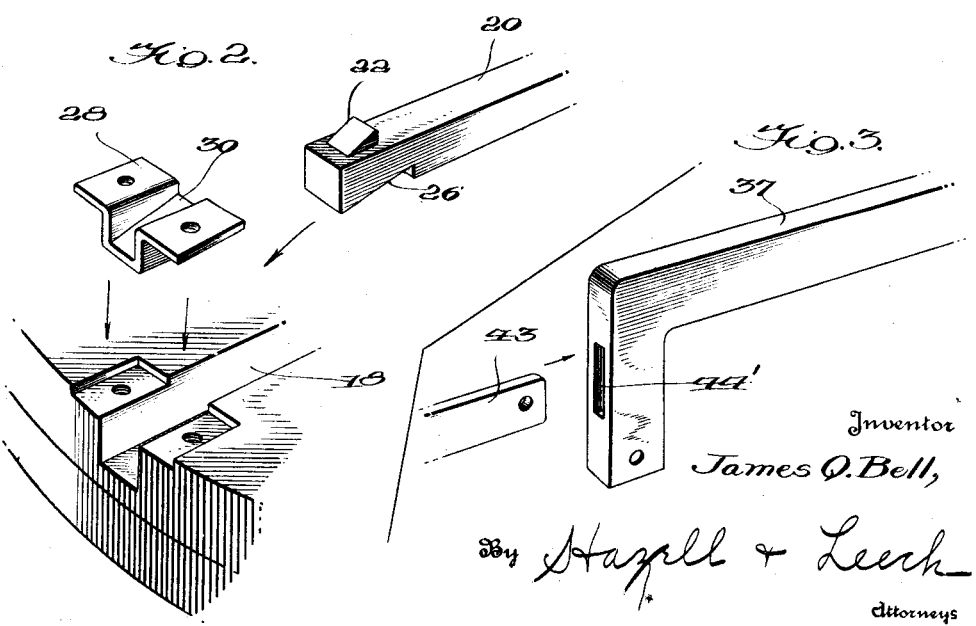
Inventor
James Q. Bell,
By Hazell & Leech
Attorneys

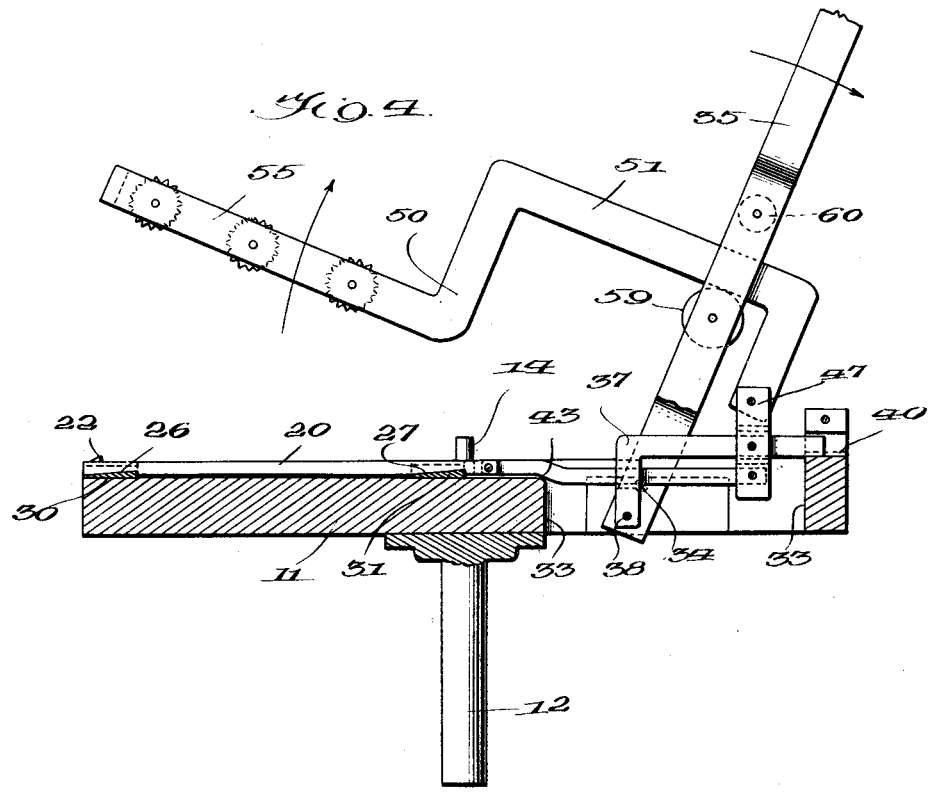
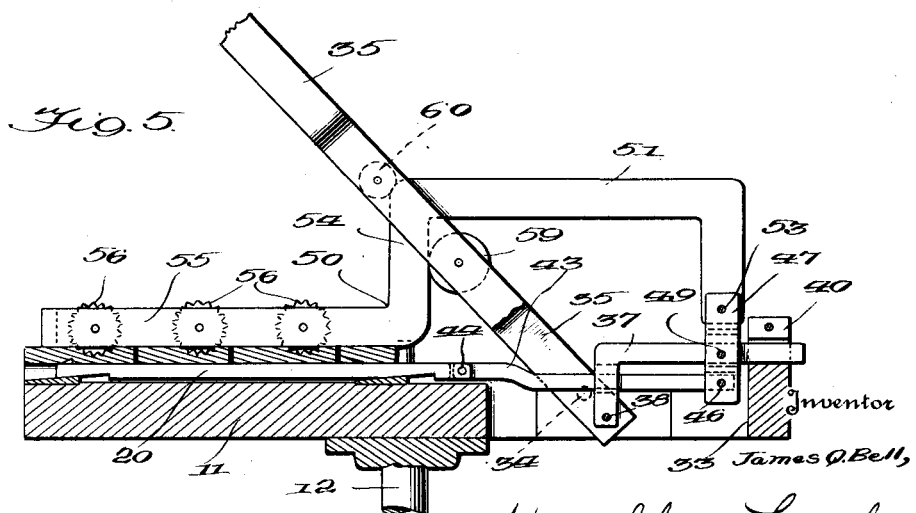

Patented Sept. 17, 1929

1,728,718

UNITED STATES PATENT OFFICE

JAMES Q. BELL, OF MULLINS, SOUTH CAROLINA

CLAMPING APPARATUS

Application filed October 13, 1928. Serial No. 312,281.

The present invention relates to head holders designed to hold in place the board lumber from which a hogshead is cut.

An object of the invention is to provide a head holder provided with mechanism for holding flat the board lumber from which the head is cut and also for moving and holding the board sections adjacent each other edge to edge so that when the head is cut there will be no cracks or openings between the board sections, and the head cut therefrom will be exactly the desired size.

The invention comprises a rotatable disc table on which the board lumber is laid, adjacent the edge of which is a vertically traveling band saw, which, when the table is rotated, cuts off the ends of the board lumber projecting beyond the edge of the circular table. The invention provides means for holding the board lumber in place on the table as it is rotated, which mechanism also performs the function of moving the board sections closely adjacent each other edge to edge and holding them there during the cutting operation.

A preferred embodiment of the invention is illustrated by way of example in the accompanying drawings, in which:

Fig. 1 is a perspective view showing the disc table and board moving and holding mechanism;

Fig. 2 is a detail perspective view illustrating the cam for the lower board-clamping member;

Fig. 3 is a detached fragmentary perspective view illustrating the actuating slide and the lower board clamp connecting link;

Fig. 4 is a sectional elevation taken centrally through the disc table and mechanism of Fig. 1, showing the parts in initial position, and Fig. 5 is a similar view of the same parts, showing them in clamping position.

Referring in detail to the drawings, a circular disc table 11 is provided with a central downwardly extending pivot pin 12, which fits in a socket on any suitable standard so that the table 11 is supported at a convenient height above the floor and is freely rotatable in a horizontal plane. A pair of stop lugs 14 and 15 project upwardly a short distance above the upper face of the table 11 and are arranged near the periphery of the table 11 substantially diametrically opposite each other, but not exactly, since they are arranged to lie tangent to and on the same side of a line drawn diametrically across the table top.

A radially extending groove 18 is provided in the top of the table which extends at right angles to a line drawn through the lugs 14 and 15 and in which is mounted, for short reciprocating movement, the lower board clamp 20, which is provided at its radially outer end with an upwardly extending, moderately sharp gripping tooth 22, which bites into the lower face of the board section overlying it and forces together the board sections lying on the table from which the hogshead head is cut, as will be hereinafter more fully described.

The lower board-clamping member not only reciprocates a short distance in the groove 18, but during its radially inward or board-clamping movement it is cammed vertically a short distance to insure its obtaining a good grip on the board sections. For this purpose the clamping member 20 is formed on its under side with a pair of slanting cam surfaces 26 and 27, which rest slidably on their respective metal cams 28 and 29 having the cam surfaces 30 and 31, the cam members 28 and 29 being set or countersunk in the table top so that no part of either of them projects above the plane of the top surface of the table. It is thus evident that movement of the lower clamping member 20 toward the right, as viewed in Fig. 4, will cause the clamp 20 to ride upward a short distance on the cam surfaces 30 and 31.

Means are provided by the invention for manually causing the foregoing movement, and, as illustrated in the drawings, a slot 33 is formed through the top of the table radially in line with the groove 18, and a manually operated actuating lever 35 is pivotally mounted in this slot on the fixed pivot pin 34. At its upper end the actuating lever 35 may be conveniently provided with a swinging handle 36, by means of which the actuating lever may be moved forwardly to board-clamping position, or rearwardly to board-releasing position, as hereinafter described.

At its lower end the actuating lever 35 is forked and within the forked portion is mounted the actuating slide 37, one end of which is bent downwardly and pivotally attached at 38 to the lower end of the forked actuating rod, and the other end of which is slidably mounted for horizontal reciprocating movement in a guide bearing 40. A lower board clamp connecting link 43 has one of its ends pivotally connected at 44 to the slidable lower board clamp 20 and, passing through the slot 44' of the actuating slide 37, has its other end pivotally connected at 46 to the lower end of a link member 47, through the central portion of which the actuating slide 37 passes, being pivotally attached to the link 47 at the central portion thereof by means of a pin 49.

The upper board-clamping member 50 has a raised portion 51, the rear end of which is bent downwardly and is pivotally secured to the link member 47 by a pin 53. A forward downwardly extending portion 54 is formed integrally at its lower end with the forked, horizontally extending board clamp 55, in which there are preferably rotatably mounted a plurality of tooth rollers 56, the teeth of which are adapted to bite into the upper surfaces of board sections to be sawed to form a hogshead head.

The upper horizontal part 51 of the upper board-clamping member 50 passes through the forked arms of the actuating lever 35 and, in the position of Figs. 1 and 4, rests upon a lower roller 59 rotatably mounted between the forked arms of said lever. On moving the actuating lever forwardly, or to the left, as viewed in Fig. 1, the roller 59 moves in an arc downwardly, and the upper board-clamping member descends to the position of Fig. 5 of its own weight, being urged downwardly into board-clamping position by engagement of the upper roller 60 with the forward end of the upper portion 51 of the upper board-clamping member, as illustrated in Fig. 5.

In operation, the actuating lever 35 is moved to the position of Fig. 1 by means of the handle 36, thus lifting the upper board-clamping member 50 on roller 59. This movement of the actuating lever 35 about its pivot 34 causes the lower end of said actuating lever, below its pivot, to move the actuating slide 37 to the left, as viewed in Figs. 4 and 5, and the actuating slide, through link 47, to which it is pivotally connected, thereby moves the upper board-clamping member to the left, as viewed in Figs. 4 and 5, and also, through link 43, moves the lower board-clamping member 20 to the left, as viewed in said figures. At the same time, the lower board-clamping member moves downwardly a slight distance on the sams 28 and 29. The parts now occupy the position of Fig. 4.

Several boards from which a hogshead head is to be formed are now laid upon the table in the following manner. The first section is placed flat on the table against the lugs 14 and 15; the second section is placed flat on the table and is slid inwardly until its edge contacts or approximately contacts the edge of the first board. Enough boards are placed on the table in this manner to cover half the table top. If desired, a whole head may be cut at once by repeating this process with another layer of boards placed upon the first layer, the innermost board abutting the lugs 14 and 15.

The actuating lever 35 is now moved forwardly by handle 36 to the position of Fig. 5. Roller 60 forces the upper clamping member downwardly so that the tooth rollers 56 bite into the upper surfaces of the boards to be cut. At the same time, the actuating slide 37 is moved to the right, as viewed in Fig. 5, and thereby moves both the upper and lower board-clamping members in the same direction. Movement of the lower board-clamping member to the right, however, is accompanied by a slight upward movement thereof due to the cams 28 and 29, and the tooth 22 on the radially outer end of the lower clamping member 20 bites into the lower face of the outermost board and forces it radially inwardly of the table, thereby forcing all the boards into edge-to-edge contact with each other. With the boards thus clamped in position, the table 11 is rotated by hand in a known manner so that the projecting ends of the clamped boards are sawed off by a vertical band saw adjacent the circumference of the table. It is evident that half a complete revolution of the table is all that is required to effect this cutting operation, though it is usually found convenient to permit the table to rotate through a complete revolution in order to bring the boards to their original position. When the sawing has been completed, the table is brought to a stop, and the actuating lever 35 is moved to the position of Fig. 1, thereby releasing the head sections for removal and moving the upper and lower clamping members radially outward of the table in preparation for their next clamping and board-moving action.

If the boards have been placed on the table in one layer, half a hogshead head will have been cut; if two layers of boards have been placed on the table, a whole hogshead head will have been cut. The head sections are now removed and are usually stacked vertically, one group of head sections forming a complete head upon another group of such sections, for future use.

It is to be noted that hogshead heads cut from boards clamped by the apparatus of the present invention are complete and perfect, with no cracks between the head sections, since the boards from which the head sections are cut are not only clamped to the surface of the table, but are each moved inwardly toward the center of the table as far as possible so that their adjacent edges are forced against each other into contact. The tooth rollers 56 hold the boards down upon the table and at the same time permit them to be moved radially inwardly by the tooth 22 to take up all space between adjacent edges of the boards.

Various changes and modifications may be made in the apparatus as above described without departing from the invention as defined by the following claims.

What is claimed is:

1. A board clamping device including a table, an upper clamping member and a cooperating lower clamping member, one of said members having board engaging means being movable horizontally for closing gaps between a plurality of board sections, stop means for said boards, and the other of said members being movable downwardly for holding said sections on said table.

2. A board clamping device including a table, and a pair of clamping members cooperating therewith and movable toward each other to clamping position and simultaneously inwardly of said table, stop means for said boards, and board engaging means on one of said clamping members.

3. A board clamping apparatus including a table, an upper downwardly movable clamping member and a cooperating horizontally movable lower clamping member, said lower clamping member having means for moving a board section radially inwardly of said table, and an actuating device for forcing both of said members simultaneously into clamping position.

4. A board clamping apparatus for holding a plurality of board sections, including a table, an upper clamping member movable downwardly to clamping position, a lower clamping member movable both upwardly and radially inwardly of said table to clamping position and having a board moving portion for closing gaps between board sections, and an actuating lever associated with both of said clamping members and operable to effect clamping action of both of said members simultaneously.

5. Board clamping apparatus for holding a plurality of board sections including means for closing gaps between such sections and thereafter holding said sections firmly in position, said means comprising a table and a pair of cooperating clamping members one of which is movable horizontally and has a board section engaging tooth movable into the face of a board section and the other of which is movable downwardly to hold said sections to said table, and a single actuating device for said pair of clamping members.

In testimony whereof I affix my signature.

JAMES QUINCY BELL.